United States Patent [19]

Hauser et al.

[11] Patent Number: 4,887,477
[45] Date of Patent: Dec. 19, 1989

[54] LINEAR DRIVE SYSTEM

[75] Inventors: Karl-Heinz Hauser, Steinenbronn; Uwe Heissel, Pliezhausen, both of Fed. Rep. of Germany; Walter Inauen, Tann-Rüti, Switzerland; Karl Neff, Waldenbuch; Manfred Ringger, Nürtingen, both of Fed. Rep. of Germany

[73] Assignee: NEFF Gewindespindeln GmbH, Waldenbuch, Fed. Rep. of Germany

[21] Appl. No.: 298,646

[22] Filed: Jan. 18, 1989

[30] Foreign Application Priority Data

Feb. 27, 1988 [DE] Fed. Rep. of Germany ... 8802615[U]

[51] Int. Cl.$^4$ ............................................ F16H 27/02
[52] U.S. Cl. .................................. 74/89.17; 74/422; 74/DIG. 10
[58] Field of Search ........ 74/89.17, 89, 422, DIG. 10; 248/637, 646, 679

[56] References Cited

U.S. PATENT DOCUMENTS

| | | | |
|---|---|---|---|
| 4,519,231 | 5/1985 | Roth | 74/89.17 X |
| 4,670,208 | 6/1987 | Koblischeck | 248/679 X |
| 4,687,361 | 8/1987 | Kikuchi | 74/422 |
| 4,753,119 | 6/1988 | Kuspert | 74/422 X |

FOREIGN PATENT DOCUMENTS 2910373 9/1980 Fed. Rep. of Germany.

Primary Examiner—James T. McCall
Attorney, Agent, or Firm—Frishauf, Holtz, Goodman & Woodward

[57] ABSTRACT

To permit constructing flexible belt-rack longitudinal-movement structures of substantial length, not subject to vibration, and inexpensively built, the rack (3) is cast integrally with a slab (2) of plastic concrete. A stiffening rib (33) can be provided in the slab, preferably at the side remote from the movable machine element (7), and preferably formed with a through-bore to attach a tension rod therethrough, so that a plurality of such slabs can be longitudinally connected together. Guide rails (5) are located at the sides of the slab, on which slide bearings (6) are located which, in turn, support a movable carriage, movable along the bed. The carriage carries the drive motor (17) which drives a gear belt (22) for engagement with the rack. Preferably, a cover web (43) covers the rack and accessory rails (41), for example for electrical energy supply and control signals, the web (43) being guided through the machine element structure and retained in position on the top surface of the slab by a flexible plastic strip (50).

15 Claims, 11 Drawing Sheets

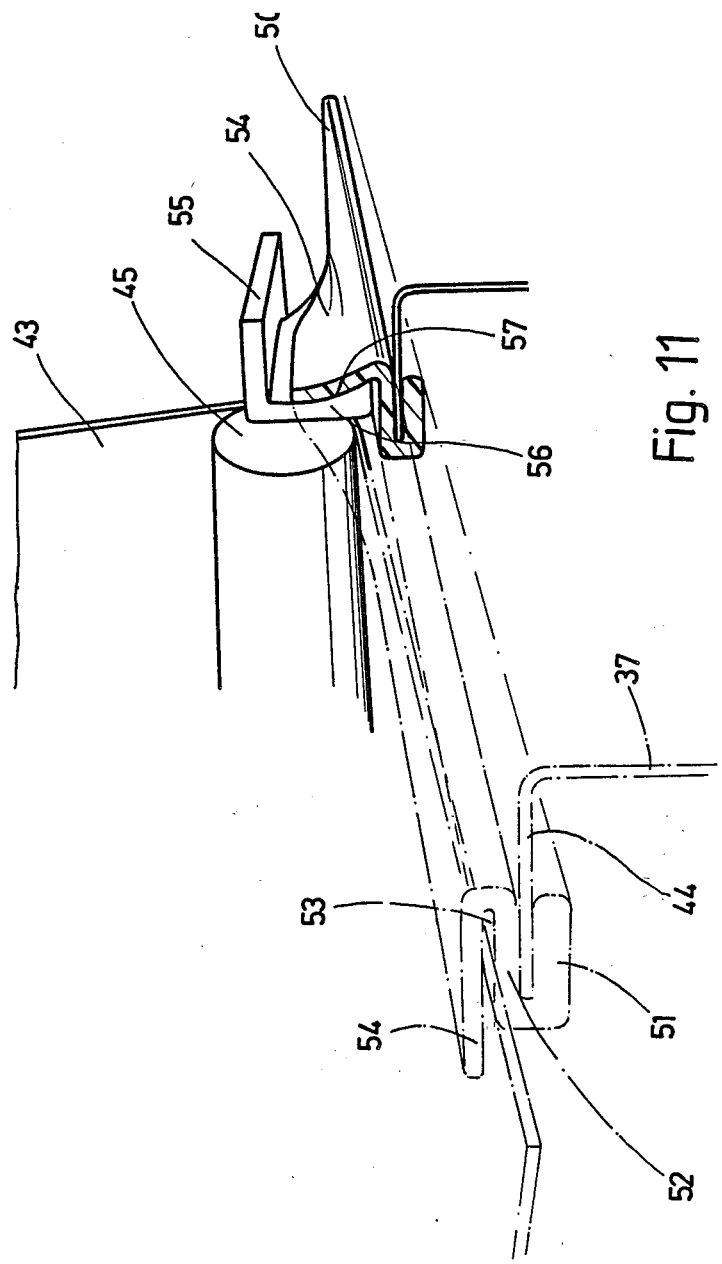

LINEAR DRIVE SYSTEM

REFERENCE TO RELATED PUBLICATIONS:

German Patent De-Ps No. 29 10 373.

"Industrie-Anzeiger" ("Industrial Gazette"), 98th year, No. 31, Apr. 16, 1976.

The present invention relates to a linear drive system, and more particularly to a system in which a movable machine element, such as a slide, carriage or the like, and relative movement between the guide element and the base element is obtained by a toothed or gear belt engaging into a rack, in which, for example, the rack is located on the base element and the gear belt is driven by a drive motor or the like located on the movable machine element, slider or carriage.

BACKGROUND

Drive systems of the type in which a driven belt engages a movable rack are described, for example, in German Pat. No. 29 10 373. The arrangement permits highly precise controlled positioning of the movable element by providing for conversion of rotary movement, for example of an electric motor to which a drive gear or similar element is coupled, into linear movement of the slider or carriage, or other element to be positioned. The arrangement is capable of positioning the movable element over long distances without play or slippage, thus providing for high positioning accuracy over long paths. The rack, in such arrangements, usually was made as one or more steel rail; if a plurality of rails are used, they can be assembled, linearly, to extend the length of the positioning path. The rack itself is made by milling the rack teeth into the steel rail. The rack may, however, also be made of the same material as the gear or tooth belt, and bonded to a carrier rails, for example by adhesives.

Long racks, for example made by milling of a steel rail, are expensive; as the length of the racks increases, the cost of making accurately formed racks increases rapidly. Additionally, the racks require complex and expensive support constructions so that the rack and guide rods or the like to define the guide path, are in predetermined alignment or position with respect to each other. This is particularly so if the loads to be carried by the movable element are large. The movable element, typically, can be used to carry automatic machine tools, robots, or other handling apparatus. All those are heavy. The arrangement of a belt engaging a rack, however, is particularly suitable for such drives because the position of the movable element with respect to the base element or base or frame of the entire system can be accurately controlled.

THE INVENTION

It is an object to provide a drive system of the gear belt - rack type which is simple to construct, has high accuracy for positioning of the movable element, and is suitable to move heavy weights and large masses without requiring complex support constructions for the rack.

Briefly, the base element includes, or is formed, as a slab of plastic concrete in which the rack is formed, for example cast, so that the slab and the rack thereon form a single unitary element. The slab carries constructional elements which define the guide path, for example supports and bearings for guide rails or guide rods located, typically, laterally of the base element.

The arrangement has the advantage that the rack and the guide path defining means or elements are a unitary structure made of concrete which includes hardenable plastic materials. Manufacture is simple; the bed or slab is simply cast in the required length and shape. If a very long displacement path is desired, a plurality of slab sections can be placed end-to-end with respect to each other, so that a movement path of any desired length can be obtained. The rack portion of this path, being cast, will have the same accuracy throughout.

Transfer of reactive forces is obtained by the interengagement of the flexible tooth belt with the rack. The teeth of the flexible belt can engage a plurality of teeth of the rack and, since the belt is elastic, the teeth of the belt can fit snugly against the teeth of the rack so that forces transferred between the teeth and the rack will distribute themselves over a plurality of teeth. This has the advantage that excessive stresses at individual localized positions will not occur. It has been found, surprisingly, that plastic concrete can accept the forces applied by the belt in the region of the rack without showing any wear. The high specific gravity of plastic concrete ensures that the bed made of this substance will not oscillate so that, even if very heavy loads are moved, no expensive oscillation or vibration suppression structures are required.

In accordance with a preferred feature of the invention, the concrete rack slab or base element is formed as an elongated unitary, essentially rectangular block. The guide structure, preferably, includes at least one guide rail secured to the bed block. By casting the bed block, the guide rails can be initially formed to include attachment elements or attachment arrangements for at least the guide rail.

High precision movement of the movable element, essentially without play, is ensured by supporting the movable element on guide rails located at either side of the bed by linear bearings.

The bed is made of plastic concrete and, in accordance with respective requirements, can be a massive block or formed with reinforcement ribs. Usually it is of advantage if the bed slab includes at least one stiffening rib which can be located either on the side facing the movable machine element or carriage, or on the opposite side, extending in longitudinal direction of the slab. The stiffening rib may, if desired, be formed with a continuous longitudinal duct or opening which permits threading of a tension rod therethrough to permit clamping a plurality of bed sections against each other, thereby extending the longitudinal path of movement, or permitting placement of a plurality of movable machine elements in precisely aligned position, which, then, can be controlled to move in precise relationship with respect to each other.

Attachments or accessories can be applied to the bed itself. For example, the bed may be cast to include attachment arrangements for current supply rails so that electrical power pick-ups, such as brushes or slider shoes, can be arranged on the carriage, to provide power and control signals for machine tools located on the slider or carriage, and drive power and control signals for the drive motor on the slider or carriage.

DEFINITION

"Plastic concrete", as used in the present specification and claims, is intended to mean cured cement with a binder having a base of polymerizable or poly-additive plastic material, if necessary and desired with additional additives. It includes reactive resin cement or the like, for example as described in the publication "Industrie-Anzeiger" ("Industrial Gazette"), 98th year, No. 31, Apr. 16, 1976.

'DRAWINGS

FIG. 11 is a perspective view, partly in section, of a detail of the drive arrangement and illustrating a covering arrangement.

DETAILED DESCRIPTION OF SYSTEM 1:

An elongated bed slab 2 is formed of cast, solid, plastic concrete. It has approximately rectangular cross section, bounded by essentially parallel surfaces.

Figure 6:
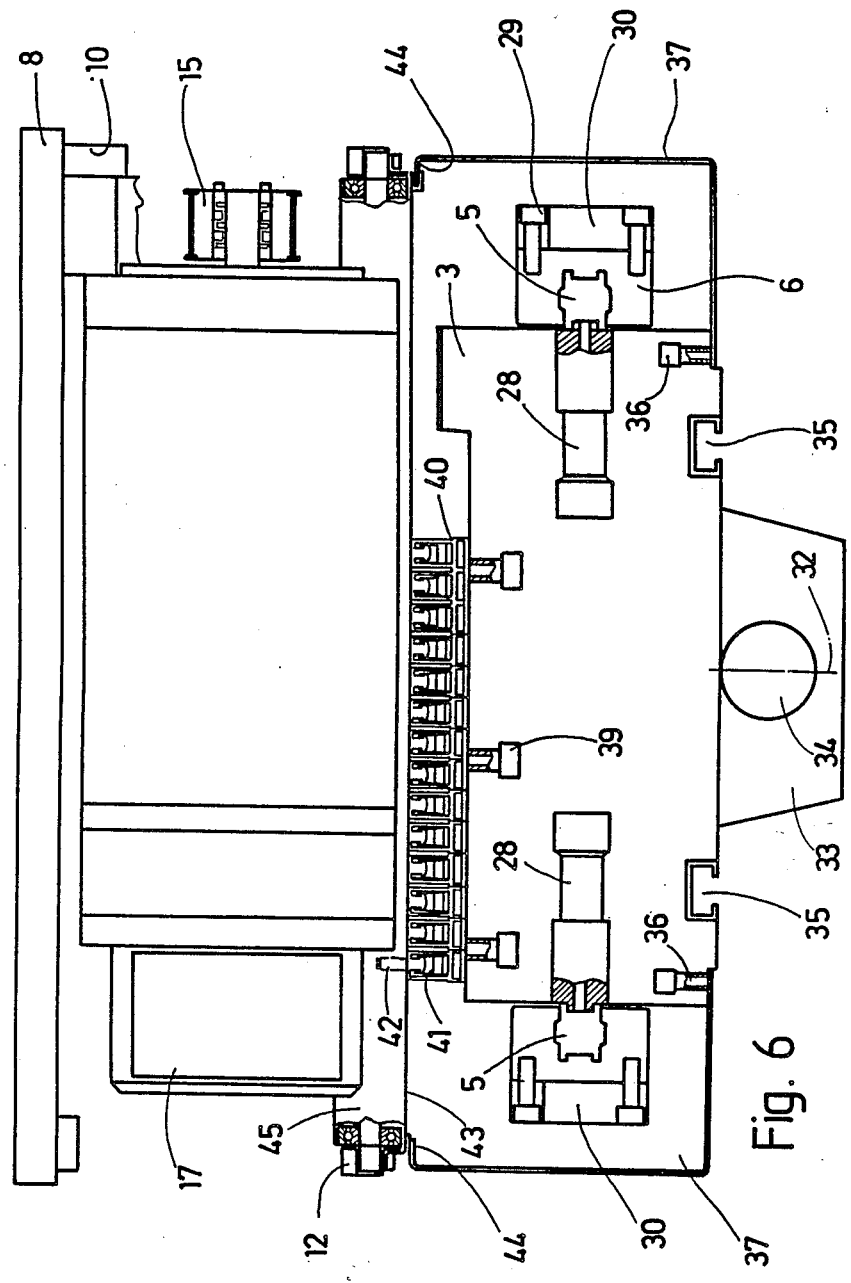
FIG. 6 shows the drive system of FIG. 1, cut along section line VI—VI of FIG. 1, and illustrated to a different scale.
Figure 7:
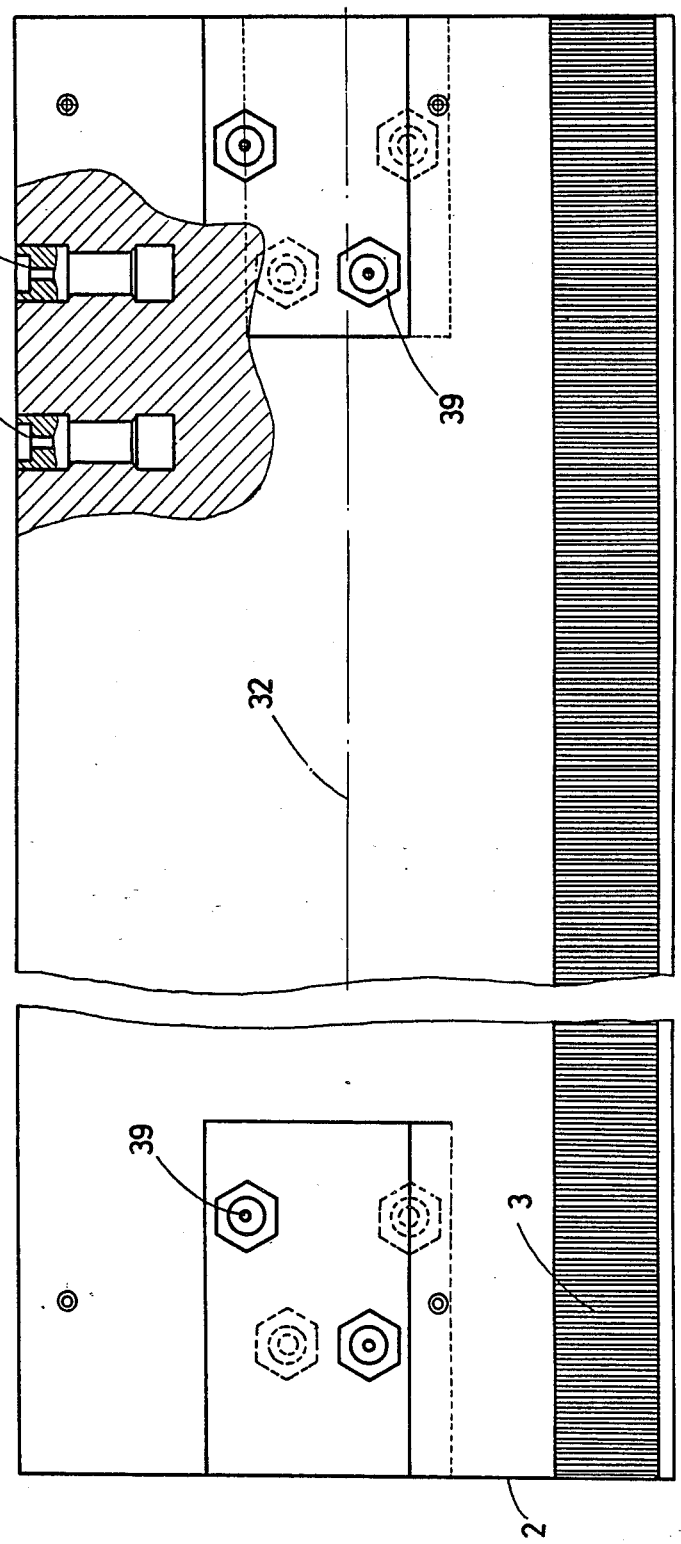
FIG. 7 is a top view of the bed element or slab, partly cup open and in section, with the movable element removed.
Figure 8:
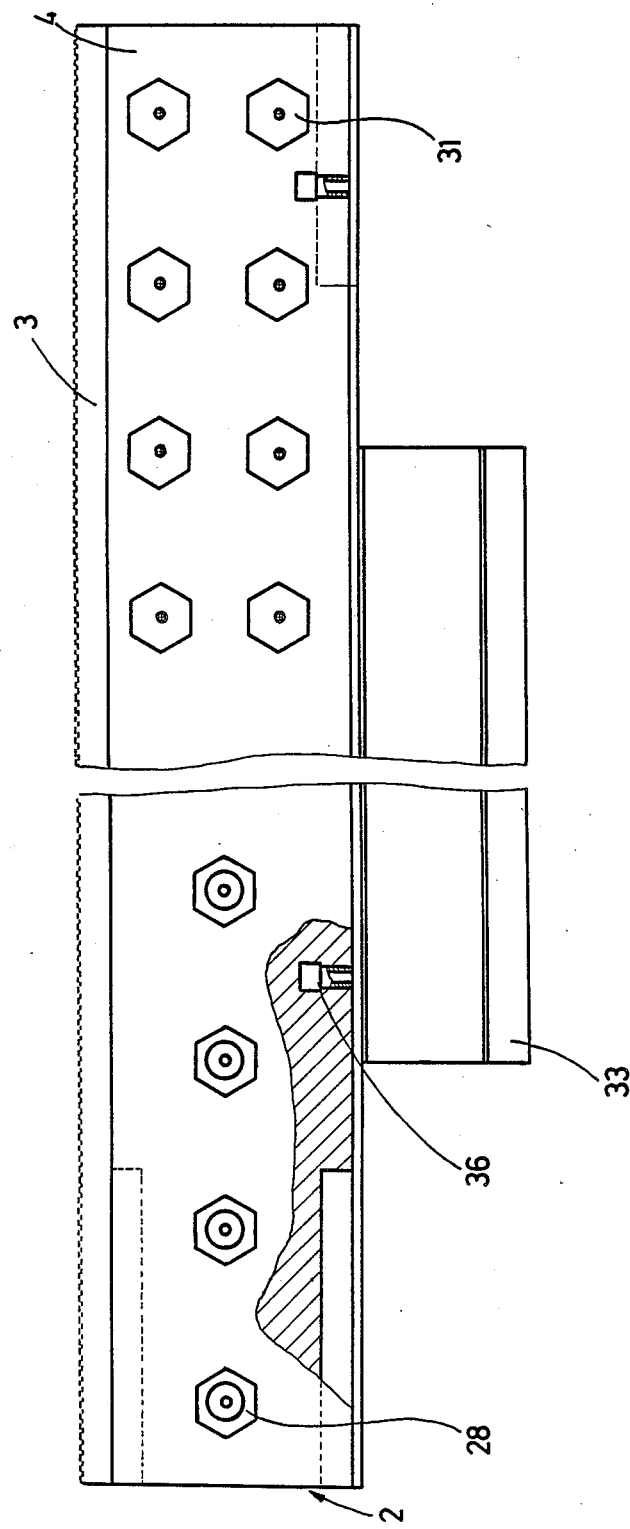
FIG. 8 is a side view of FIG. 7, partly cut open and in section.

In accordance with the present invention, a flat upper surface has a rack 3 cast or formed on the slab, the rack 3 extending parallel to the side walls 4. In accordance with a feature of the invention, the cast rack 3 is located laterally offset with respect to a longitudinal central plane 32. The teeth of the rack are straight and extend at right angles to the central plane 32 (FIG. 6).

Figure 3:
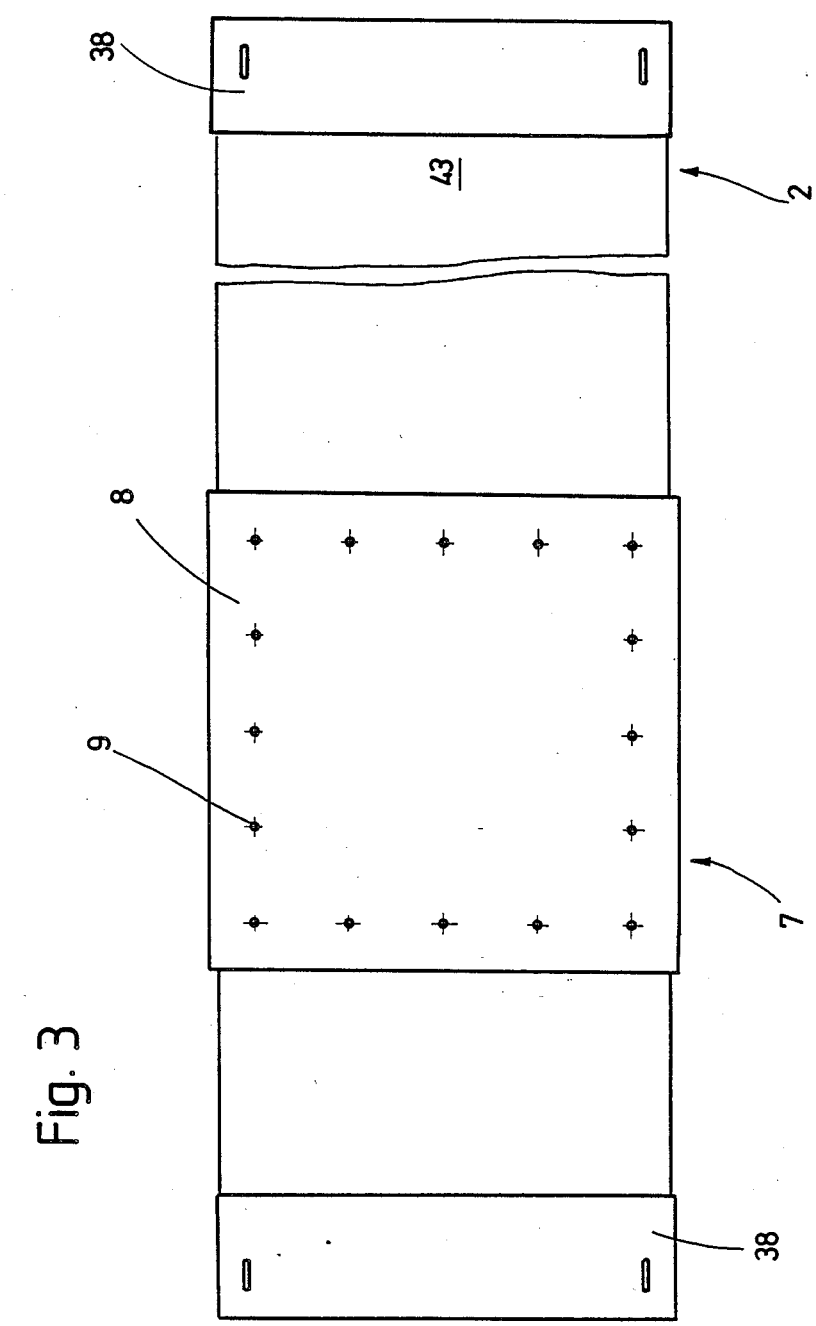
FIG. 3 is a top view of the system of FIG. 1.
Figure 4:
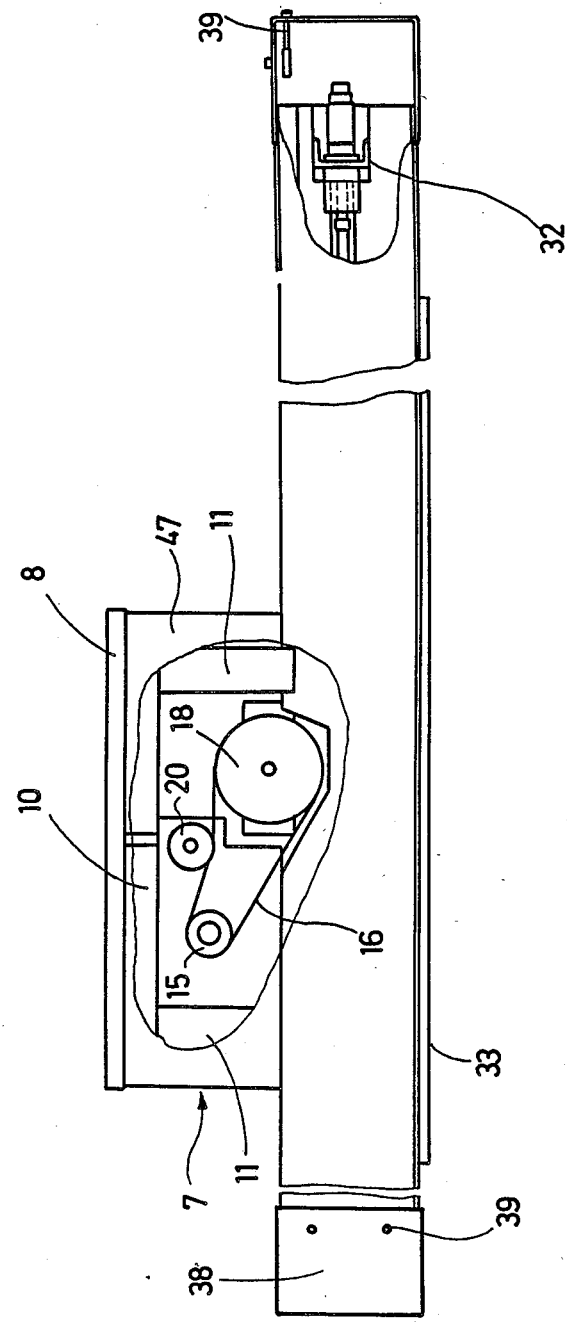
FIG. 4 is a partly cut-open side view of the system of FIG. 1.
Figure 5:
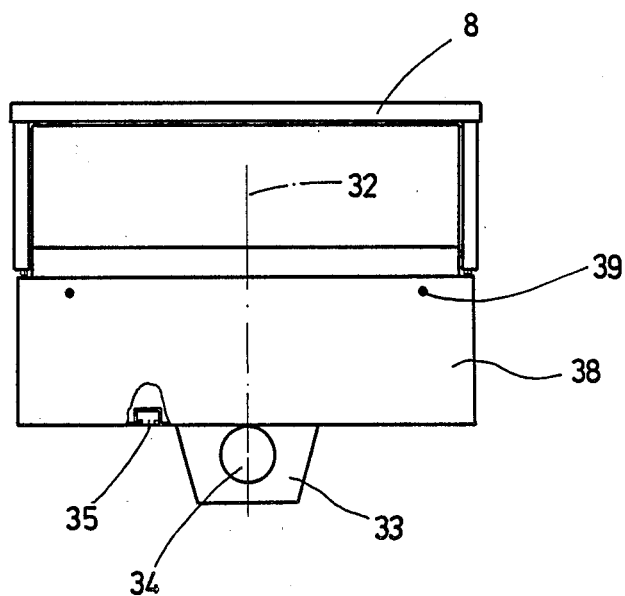
FIG. 5 is an end view of the system of FIG. 1, partly cut open.

Two parallel guide rails 5 are located laterally on the side walls 4 of the bed slab 2. Four linear bearings 6 support an essentially rectangular, in cross section, slider or carriage 7 for longitudinal movement on the guide rails 5. The carriage 7 supports a flat attachment plate 8 at the top, the plate 8 being formed with threaded bores 9 (FIG. 3) so that apparatus to be linearly transported, for example robots, machine tools or the like, can be secured to the support plate 8 by suitable attachment screws or bolts.

Figure 10:
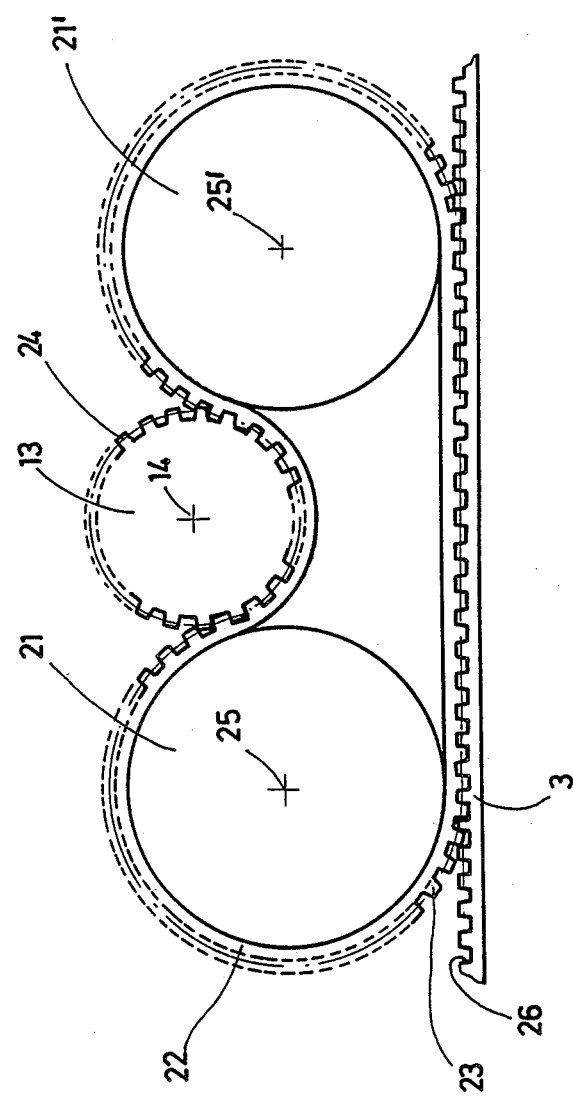
FIG. 10 is a detail view of the drive arrangement.

The carriage 7 is formed of welded elements 10, 11, 12. The welded elements form a support structure or support frame which supports a drive gear or pinion 13 having a shaft with an axis 14 (FIGS. 2, 10). The drive shaft is securely coupled to a coaxial gear drum 15 (FIG. 2), so that gear 13 and drum 15 rotate together. Drum 15 is driven by an endless gear belt 16 by engagement with a drive drum 18 secured to the shaft of an electric motor 17. A tension roller 20 provides for appropriate tension of the gear belt 16. Bearings for the respective shafts of the drum and gears have been omitted from the drawings in FIGS. 1, 2 and 10 for simplicity, and can be located as desired in accordance with customary engineering practice.

Two freely rotatable rollers 21, 21' (FIGS. 2, 10) are located laterally adjacent the gear 13. An endless gear belt 22, with the gear teeth thereof facing the outside of the rollers 21, 21', is passed about the rollers 21, 21' and the gear 13, as best seen in FIG. 10. The gears 24 of the gear 13 engage the gear teeth of the belt 22. The axes of rotation 25, 25' of the rollers 21, 21' are spaced from each other and are so positioned with respect to the rack 3 on the slab 2 that the belt 22 will engage with its teeth 23 in the teeth 26 of the rack 3, and is securely retained in the rack with such engagement.

BASIC OPERATION

Upon rotation of motor 17, gear 13 is rotated via the drum 18 and bolt 16. Gear 13 will rotate about its axis of rotation 14, so that the toothed or gear belt 22, in engagement therewith, will continuously roll off about the gear teeth 26 of the rack 3. Consequently, the carriage 7 will carry out a linear movement along the guide rails 5, and hence with respect to the slab or bed 2. The rollers 21, 21' as well as the gear 13 are positioned above the rack 3, preferably precisely above the rack 3. The axial extent of the rollers 21, 21', and of the gear 13, preferably, is slightly wider than the width of the rack 3. The width of the belt 22, preferably, is the same or about the same as that of the rack 3.

Referring now to FIGS. 6 to 9: The bed block 2, made of plastic concrete, has threaded anchor plugs 28 located in the side walls 4, facing each other, so that the guide rails 5 can be secured thereto by suitable bolts, not further shown. The guide rails 5, in general, have a double-T cross section. They support four ball bearing running tracks, on which linear bearings 6 with circulating balls can run off. Attachment blocks 30 (FIGS. 1, 6) are secured to the linear bearings 6 by bolts 29. The frame has frame elements 11 secured to the blocks 30, for example by welding.

One end of the bed 2 has additional anchor sleeves 31 (FIG. 8) secured thereto which can be used to attach elastic end position dampers for the carriage to the side walls, or to attach connecting straps, so that multiple bed blocks 2 can be securely connected together also at the side walls.

The bed block 2 is formed with a stiffening rib 33 (FIG. 6) at the side remote from the carriage 7, located preferably symmetrically to the vertical central plane 32. The stiffening rib 33, unitary with the block 2, is formed with a through-bore 34. Aligned through-bores 34 of several bed blocks 2 can be connected together by a tension bolt or rod, passed through the opening 34 so that the blocks are additionally secured and attached together. The tensioning rod is omitted from the drawing for clarity.

Two parallel U-profiled rails 35 are placed in the bed slab 2, extending parallel to the stiffening rib 3 and located at the lower side thereof. These rails 35 can be used to attach the bed slab 2 to a base or the like by means of clamping screws. Anchor sleeves 36, cast into the bed slab 2, are provided to retain lateral cover sheets 37, for example of sheet metal. The cover sheets have essentially U-shaped cross section, and are attached by screws passing into the anchor sleeves 36. The cover sheets 37 provide protection for the guide rails 5 and for the linear bearings to prevent contamination, for example by dust, dirt and the like. End housings 38 are attached by screws 39 to completely close off the region of the guide tracks 5 and the end damper 32, and provide encapsulation for the sides, bottom and ends of the rail structure.

The flat upper surface of the bed slab 2 has threaded or thread receiving anchor sleeves or shields 39 cast therein, on which an electrical insulation carrier 40 (FIG. 6) is secured. The insulation carrier 40 may be a single element or a multi-part element. The insulation carrier 40 carries parallel current supply rails 41, electrically insulated with respect to each other, and in electrical connection with current pick-ups, schematically shown at 42, and secured to the carriage 7 (see FIG. 6). The current supply rails provide electrical power supply for the drive motor 17 and provide energy for accessory equipment secured to the top plate 8. Additional movable current supply rails can be provided for communication and control lines for the carriage 7 as well as the accessory equipment.

Figure 1:
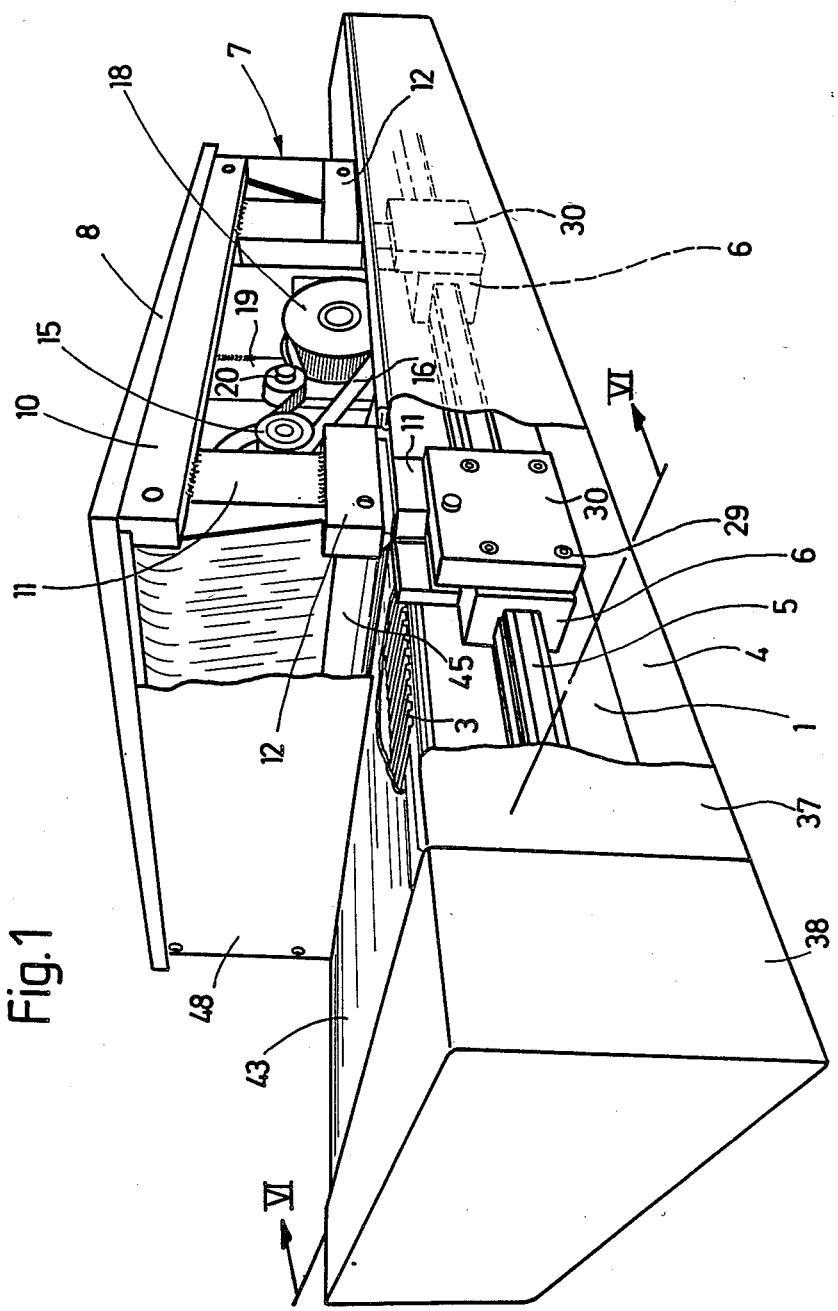
FIG. 1 is a schematic view of the drive system, partly cut away to show interior construction.
Figure 2:
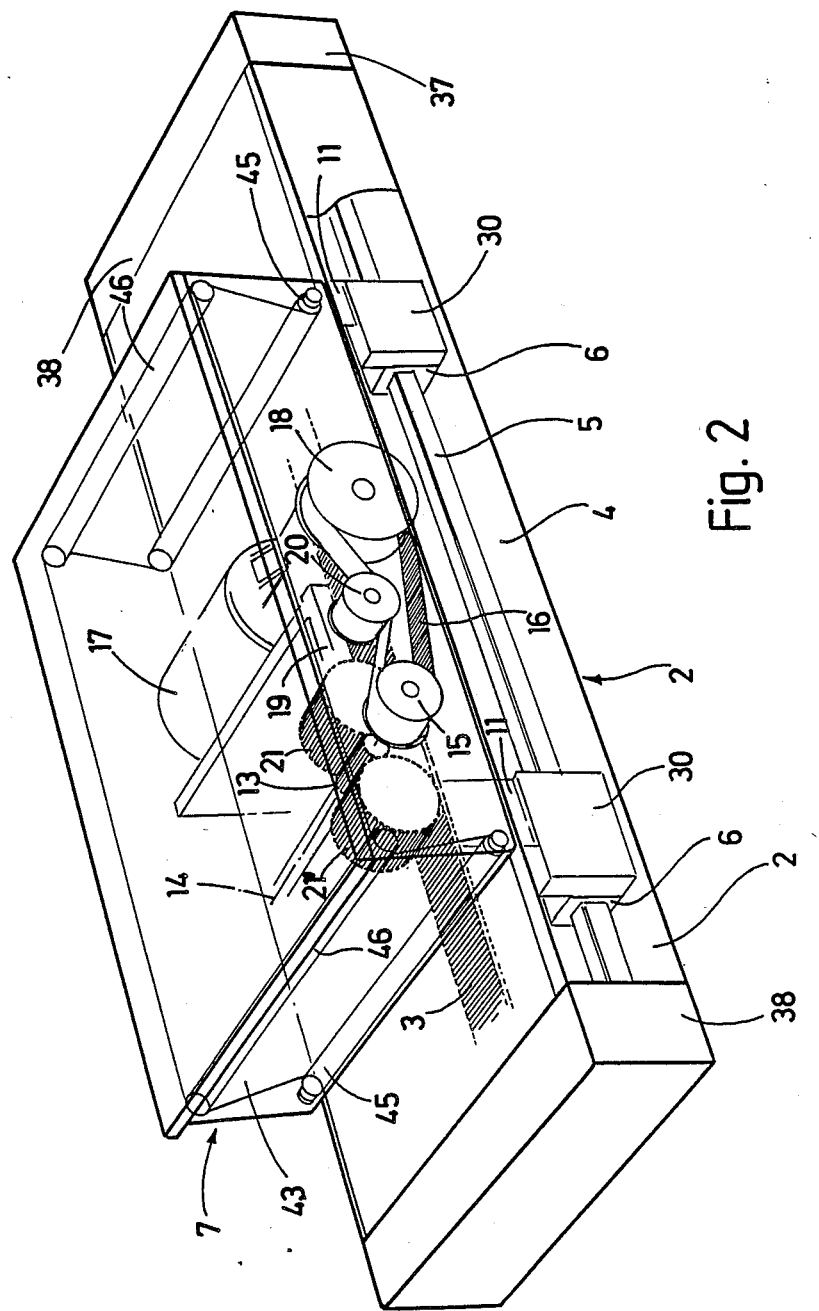
FIG. 2 is the drive system of FIG. 1 in a top-schematic representation, partly in phantom, to show internal construction.

The current supply rails 41 and the rack 3 are covered at both sides of the slider 7 by a thin flexible cover web or foil band 43 (see FIGS. 1, 2 and 11). The web 43 is secured at its ends to the sheet-metal housing 38 on the base block 2. The width of the web 43 is so selected that it overlaps inwardly bent flanges 44 (FIGS. 6, 11) of the housing cover sheets 37. The web 43 is guided at the forward and rear sides of the carriage 7 about rotatably retained guide or deflection rollers 45, to be deflected upwardly, up to just below the attachment plate 8. Two further deflection rollers 46 then deflect the web 43 horizontally beneath the plate 8, to be deflected again by deflection rollers 46 into horizontal direction, and parallel to the plate 8. Lateral cover sheets 47, 48 close off the carriage 7 towards the outside. The arrangement ensures that the bed slab 2 and all apparatus thereon, that is, the rack 3 and the current take-up rails 41, and the entire top side of the bed slab 2, are closed off reliably and independently of the respective position of the carriage 7 with respect to the bed 2.

If the bed 2 is very long, for example by placing a number of bed structures linearly along each other, it may happen that the cover web 43 has the tendency to lift the flanges 44 off of the cover sheets 37, or shifts laterally with respect thereto. A special arrangement, best seen in FIG. 11, is provided to prevent this from happening.

A flexible sealing strip, of a special shape 50, and made of plastic material, is associated with the flange 57. The plastic profiled tape or strip 50 has a double-bent shape, in cross section, so that it will be essentially S or Z-shaped. In essence, the strip 50 has an engagement leg 52 and an attachment leg 51 extending parallel to the engagement leg 52. Facing the web 43, the strip 50 has a flexible lip, so that a slot 53, which can be opened, is formed into which the web 43 can enter. The lip 54 extends over the web 43. The strip 50, with its generally U-shaped legs or portions 51, 52, is snapped or clamped on the flange 44. The lip 54 is resiliently biased, by the manufacturer of the strip, against the web 43, so that the web 43 is securely clamped in the slot 53 to be tight against dust, lubricants, or the like.

The carriage 7 is formed with L-shaped spreading elements 55, located in the region of the lower deflection rollers 45 for the web 43. The spreading elements, in cross section of L shape, have an approximately vertically located leg 56 formed with a somewhat bent or outwardly curved engagement surface 57 for the lip 54 of the strip 50. FIG. 11 clearly shows the arrangement, in which the somewhat wedge-shaped rounded surface 57 engages beneath the lip 54 in such a manner that it is bent upwardly in the region of the lower deflection rollers 45. The leg 56 is laterally adjacent the neighboring edge of the web 43, so that the web 43 can freely slip beneath the bent-up lip 54 out of the slip 53 upwardly or, at the opposite side, can be guided back into the slot 53, where it is clamped under the inherent elasticity of the lip 54 which closes in the region in advance of and behind the respective spreader element 55.

Figure 9:
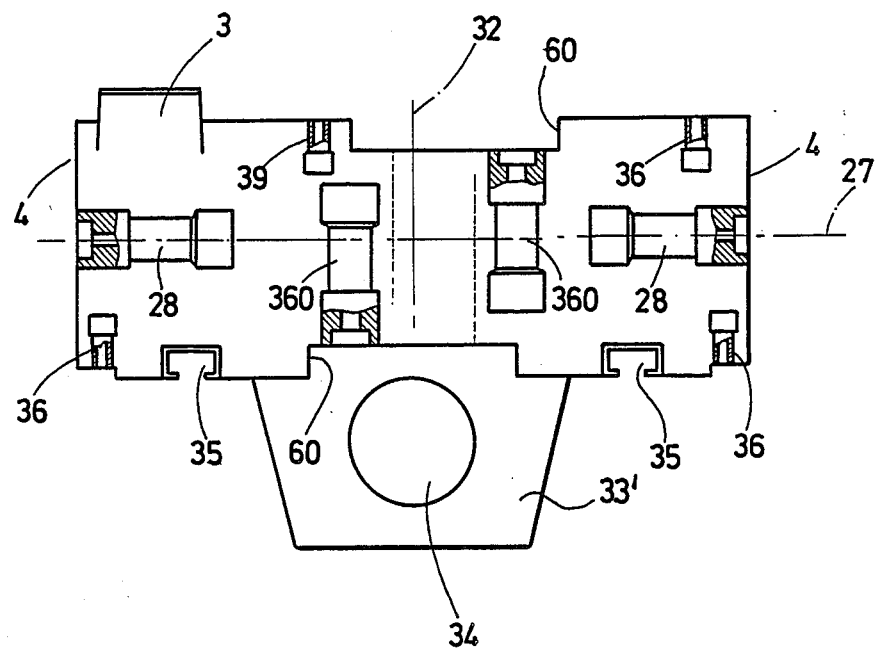
FIG. 9 is an end view of the bed of FIG. 7.

The stiffening rib 33 (FIG. 6) preferably is uniform with the bed slab 2. It is also possible, however, to provide a separate stiffening rib, screw-connected to the bed slab 2 at the upper, or lower side, respectively, in which case the bed slab 2 should be formed with threaded or thread-receiving anchor sleeves or bushings 360 (FIG. 9). A guide groove 50 provides for alignment of the stiffening rib 33 on the bed 2.

Various changes and modifications may be made, and any features described herein may be used with any of the others, within the scope of the inventive concept.

We claim:

1. Linear drive system for linearly moving a movable machine element (7, 8) along a predetermined guide path, having
   a base element (2) including means (5) for defining said guide path;
   a toothed or gear belt (22) and means (13-18, 20) for driving said toothed or gear belt supported on said machine element; and
   a rack means (3) positioned for engagement with said gear belt (22),
   wherein, in accordance with the invention,
   said base element (2) includes a slab or block of plastic concrete in which said rack means (3) are formed, so that said slab and rack means form a unitary element; and
   wherein said slab carries said guide path defining means (5).

2. The system of claim 1, wherein said slab (2) forms a machine bed and is of elongated block shape.

3. The system of claim 1, wherein said means for defining said guide path comprises at least one guide rail (5) secured to said slab.

4. The system of claim 3, further including attachment means (28, 31, 36, 39) positioned within said slab or block, said at least one guide rail (5) being secured to at least some of said attachment elements.

5. The system of claim 3, further including linear bearing means (6) secured to said machine element, and supporting said machine element on said at least one rail.

6. The system of claim 1, wherein said slab or block 92) includes at least one longitudinally extending stiffening rib (33) located on a surface which is parallel to said guide path.

7. The system of claim 6, wherein said stiffening rib (33, 33') is formed with a through-bore or duct (34).

8. The system of claim 1, wherein said slab is a cast concrete structure, said rack means being cast unitarily with said structure.

9. The system of claim 8, further including a stiffening rib (33) extending longitudinally of said slab, cast as a portion thereof and unitary therewith.

10. The system of claim 8, wherein said cast structure includes an elongated positioning recess;
    and a stiffening rib (33') secured to said cast slab and located in said positioning recess.

11. The system of claim 1, further including electrical energy supply rails (40, 41) located on said slab (2) at the side thereof facing the movable machine element (7);

and current pick-up means (42) electrically connected to said energy supply rails on the movable machine element.

12. The system of claim 1, further including a flexible cover web (43) covering the slab (2) at least at the side at which the movable machine element (7) is located, said covering web (43) being guided about said movable machine element (7) to permit linear movement of said movable machine element while covering the portions of the bed free from coverage by said movable machine element.

13. The system of claim 12, wherein said movable machine element (7) comprises a hollow structure;

and said covering web is guided through the hollow structure of the machine element.

14. The system of claim 12, further including a longitudinally extending flexible plastic strip (50) having a flexible lip (54) extending over the covering web (43), the flexible plastic strip being located on at least one of the longitudinal sides of the slab (2) and along said guide path;

and a spreading element (55) secured to the machine element (7) shaped to fit under said flexible lip (54) and lifting said lip, one, each, spreading element being located at the longitudinal terminal ends of said movable machine element for permitting the covering web (43) to be lifted out from beneath said flexible lip (54) upon movement of the movable machine element at the leading side thereof, and for being returned over the covering web (43) at the trailing side thereof.

15. The system of claim 14, wherein said flexible plastic strip (50) has, in cross section, an essentially S or Z shape including an engagement leg or portion (52) and a clamping leg or portion (51) defining, therebetween, a holding space;

wherein a holding shield element (44) is secured to said bed to fit into said holding space;

and wherein, between the attachment leg and said lip (54), a slot (53) is defined, said web (53) fitting in said slot.

* * * * *